United States Patent [19]

Locke

[11] Patent Number: 4,627,555

[45] Date of Patent: Dec. 9, 1986

[54] INGREDIENT FEEDER APPARATUS

[76] Inventor: Michael P. Locke, 15 Reppert Blvd., Uniontown, Pa. 15401

[21] Appl. No.: 725,236

[22] Filed: Apr. 19, 1985

[51] Int. Cl.[4] .................................. G01F 11/20
[52] U.S. Cl. ......................... 222/200; 222/201; 222/342; 222/413; 222/533; 366/154; 74/54
[58] Field of Search ............... 222/196, 199, 200, 201, 222/526, 533, 536, 537, 161, 164, 166, 226, 227, 236, 238, 412, 413, 342, 74; 366/154; 137/268; 198/533; 74/54

[56] References Cited

U.S. PATENT DOCUMENTS

| 2,729,362 | 1/1956 | Hughes | 222/161 |
| 2,801,773 | 8/1957 | Vitkin | 222/200 |
| 3,212,624 | 10/1965 | Hess | 222/161 X |
| 3,240,401 | 3/1966 | Kirschmann | 222/412 X |
| 3,831,906 | 8/1974 | Wakeman | 259/6 |
| 3,874,641 | 4/1975 | Tolan | 222/200 |
| 4,043,487 | 8/1977 | Price | 222/166 |
| 4,083,475 | 4/1978 | Venner et al. | 222/198 |
| 4,336,822 | 6/1982 | Carrell | 137/268 |
| 4,346,802 | 8/1982 | Popper | 198/533 |
| 4,461,405 | 7/1984 | Adamson | 222/201 |

OTHER PUBLICATIONS

Crepaco Bulletin M-1-300 entitled "Ingredient Feeders".

Primary Examiner—Joseph J. Rolla
Assistant Examiner—David H. Bollinger
Attorney, Agent, or Firm—Webb, Burden, Robinson & Webb

[57] ABSTRACT

An ingredient feeder for adding a first ingredient to a second ingredient including a hopper for receiving and discharging the first ingredient and a rotating auger located within the hopper. A portion of the auger extends out of the hopper and is surrounded by an auger housing. The auger housing has a discharge opening formed therein. A hollow chamber funnel is pivotally mounted to the auger housing and surrounds the discharge opening. A metering wheel housing, having a metering wheel therein, is positioned beneath the auger housing and the funnel directs a first ingredient into an inlet of the metering wheel housing. A passage extends below an outlet of the metering wheel housing and is in fluid communication therewith. The first ingredient is discharged from the metering wheel housing outlet into a second ingredient flowing through the passage. The funnel is oscillated relative to the auger housing. The oscillation is periodically and abruptly stopped such that a force is generated on the funnel which is sufficient to jar loose any of the first ingredient which becomes lodged in the funnel or in the metering wheel housing inlet. A chamber funnel which can be used in directing ingredients in an ingredient feeder apparatus is also disclosed.

19 Claims, 13 Drawing Figures

INGREDIENT FEEDER APPARATUS

BACKGROUND OF THE INVENTION

1. Field of the Invention

This invention relates to ingredient feeder machines and, more particularly, to an ingredient feeder which has an improved mechanism for oscillating a chamber funnel and periodically and abruptly stopping the oscillation in order to prevent jamming and improve the flow of ingredients through the ingredient feeder.

2. Description of the Prior Art

The use of ingredient feeding machines, also called ingredient feeders, is well known in the art. Ingredient feeders are typically used for continuous, simultaneous and uniform metering and blending of one or more ingredients into a flowing stream of a second ingredient, such as ice cream or other product. In the manufacture of ice cream, it is common to make a plain ice cream in a separate freezer mechanism and then pump the ice cream through an appropriate conduit to a packaging machine. If desired, fruits, nuts, candies and the like may be mixed into this flowing stream of ice cream by placing an ingredient feeder into the conduit system. The ingredient feeder functions to portion and properly blend the desired ingredient or ingredients into the stream of ice cream and then pass the blended ice cream product to the packaging machine where the ice cream is placed in containers or the like.

A commonly used ingredient feeder includes a feeder hopper which has an agitator inside of the hopper for continuously feeding the desired ingredient to a rotating auger at the bottom of the hopper. The ingredient is broken up or separated into smaller pieces by the agitator and is carried out of the hopper by means of the auger to a hollow chamber funnel. The ingredient is passed into the chamber funnel at a controlled rate of speed. A metering wheel housing having a metering wheel therein is positioned beneath the lower end of the chamber funnel. In this manner, the chamber funnel directs the ingredients from the auger and into the top of the metering wheel housing. The metering wheel accurately portions the ingredient and deposits it into the stream of ice cream passing beneath the outlet of the metering wheel housing. The ice cream, with the ingredient placed therein, then passes into a blender, such as a vertical side blender, which thoroughly mixed together the ice cream and deposited ingredient. The mixed ice cream product then passes out of the blender and into the remaining portion of the system for packaging. Ingredient feeders as described above are manufactured by Crepaco, Inc. of Chicago, Ill. and are identified as the Model Series S ingredient feeders. Another known ingredient feeder is shown in U.S. Pat. No. 3,831,906.

It has become very popular recently to mix broken pieces of cookies, including cream filled cookies, into ice cream. Ice cream manufacturers have attempted to use standard ingredient feeders for mixing cookies into ice cream. In using standard ingredient feeders the cookies, especially the cream filled cookies, become jammed beneath the auger in the bottom of the chamber funnel and in the top of the metering wheel housing. The flow of the cookie pieces through the machine can be severely restricted and result in an uneven amount of cookie pieces being deposited into the ice cream. Such an uneven product quality is not acceptable in the marketplace. In addition, the machine cannot be operated continuously but must be shut down periodically while the chamber funnel is dismantled and the mechanism is cleaned thoroughly. While the prior art ingredient feeders include a vibrating mechanism as an accessory, such vibrating mechanisms are not satisfactory in dislodging the cookies pieces and keeping a steady flow of cookie pieces through the machine. Moreover, the known ingredient feeder vibrating mechanisms feed the ingredients directly into the top of the chamber funnel with a mechanism completely separate from the ingredient feeder. This separate mechanism occupies additional floor space and a separate power supply is needed to operate the vibrating portion of the mechanism.

A wide variety of vibrating hoppers or feeders are known in the prior art. Such devices are shown, for example, in U.S. Pat. Nos. 2,801,773; 4,043,487; 4,083,475; 4,336,822; 4,346,802; and 4,461,405. While the vibrating element in these devices aids in keeping the materials flowing and minimizing clogging or the like, none of these devices develops a sufficient vibrating force to satisfactorily keep cookie pieces, particularly cream filled cookies or the like, flowing through an ingredient feeder.

It is an object of the present invention to provide an improved ingredient feeder with an oscillating type of mechanism which will allow the ingredient feeder to pass cookie pieces therethrough in an even and unrestricted manner.

It is a further object of the present invention to provide such an improved ingredient feeder in which the oscillating mechanism is built directly into the ingredient feeder and does not require a separate unit. Moreover, it is an object of the present invention to provide such an oscillating mechanism which does not require an additional power source for its operation.

It is also an object of the present invention to provide, in an ingredient feeder, an oscillating mechanism which is simple to install and operate, which does not interfere with the normal operation of the ingredient feeder, and which is relatively inexpensive.

SUMMARY OF THE INVENTION

Accordingly, I have invented an ingredient feeder which can be used for adding a first ingredient to a second ingredient in an improved manner. This ingredient feeder includes a hopper for receiving and discharging a first ingredient and a rotating auger located within the hopper. A portion of the auger extends out of the hopper and is surrounded by an auger housing. The auger housing has a discharge opening formed therein and a hollow funnel is pivotally mounted to the auger housing and surrounds the discharge opening. A metering wheel housing, having a metering wheel disposed therein, is positioned beneath the auger housing and the funnel functions to direct a first ingredient into an inlet of the metering wheel housing. A passage extends below an outlet of the metering wheel housing and is in fluid communication therewith through an intermediate opening in said passage. The first ingredient is discharged from the metering wheel housing outlet into a second ingredient flowing from an inlet end to a outlet end of said passage. The funnel is oscillated relative to the auger housing. The oscillation of the funnel is periodically and abruptly stopped such that a force is generated on the funnel which is sufficient to jar loose any of the first ingredient which becomes lodged in the funnel or in the metering wheel housing inlet.

The means for oscillating the funnel includes a first arm connected to the funnel and extending outwardly therefrom over the top of the metering wheel housing and a second arm connected to the funnel and extending outwardly therefrom over the top of the metering wheel housing in a direction generally opposite that of the first arm. The first arm is connected by a resilient means to a fixed point and the second arm is connected to a vertically reciprocating means. The oscillation of the funnel results from both the force exerted on the second arm from the reciprocating means and also from with the force exerted on the first arm when the resilient means is tensioned during the motion of the funnel about the auger housing. The oscillation of the funnel is periodically and abruptly stopped when the first arm and second arm strike the top of the metering wheel housing. Preferably the fixed point and the vertically reciprocating means are disposed beneath the first and second arms. The resilient means is preferably an elastomeric band and the second arm is preferably connected to the vertically reciprocating means by another elastomeric band.

An outer end of the first arm has a first roller pivotally mounted thereto and an outer end of the second arm has a second roller pivotally mounted thereto. The elastomeric bands are connected to the arms by means of the first and second rollers. The outer end of each arm has a means, preferably a plurality of spaced holes therein, for vertically adjusting the position of the rollers. The fixed point, to which the first arm is connected, preferably includes another roller which is pivotally mounted to a clamp secured around the outlet end of said passage.

The vertically reciprocating means is preferably integral with and already existing on the structure of an ingredient feeder. In a preferred embodiment, the vertically reciprocating means is formed by a wiper arm which is disposed in said passage and is secured to a pivotally mounted shaft, which shaft is also connected to a cam bar at one end and the cam bar is biased downwardly at a free end by a resilient means, such as another elastomeric band. The wiper arm is biased upward and in contact with the metering wheel. As the metering wheel rotates the wiper arm follows the irregular surface of the metering wheel and moves vertically. As a result, the free end of the cam bar oscillates freely. An elastomeric band connects the free end of the cam bar to the second arm.

In addition, if the auger housing has an inlet opening spaced above the discharge opening, the funnel preferably has mounted therein one or more baffles which are adapted to direct another ingredient directly into said inlet opening.

The funnel preferably has mounted thereto, near its lower end, an elongated rocker bar. The rocker bar has one end extending outwardly beyond the funnel and forming the first arm and has another end extending outwardly beyond the funnel and forming the second arm.

I have also invented a chamber funnel which can be used in directing ingredients in an ingredient feeder. The funnel includes a hollow funnel having an open top and an open lower end and having a downwardly sloping interior surface. The funnel also includes a pair of opposed aligned side openings. The openings have a configuration which is complementary with the exterior configuration of an auger housing on an ingredient feeder so that the funnel can be pivotally mounted on said auger housing. The funnel also has a first arm connected to the funnel and extending outwardly therefrom with the first arm being adapted to be connected by a resilient means to a fixed point on the ingredient feeder. The funnel also has a second arm connected thereto and extending outwardly therefrom in a direction generally opposite that of the first arm. The second arm is adapted to be connected to a means for vertical reciprocation on the ingredient feeder. The chamber funnel may also include the pivotally mounted rollers, means for vertically adjusting the position of the rollers, baffles, and a rocker arm as discussed above. The chamber funnel may also include a wear bearing located at each side opening and mounted to the funnel.

BRIEF DESCRIPTION OF THE DRAWINGS

Like reference numerals are used to identify like elements in the drawing figures.

DESCRIPTION OF THE PREFERRED EMBODIMENT

One embodiment of an improved ingredient feeder in accordance with the present invention is shown in FIGS. 1–7. The ingredient feeder 2 is basically a box-shaped structure which is mounted on a plurality of wheels 4. The ingredient feeder 2 can be wheeled in position next to an ice cream machine (not shown) whenever it is desired to mix one or more ingredients with the ice cream and can be moved out of position when it is no longer needed. The upper portion of the interior of the ingredient feeder 2 is formed in a hollow, open-topped feeder hopper 6 which is adapted to receive and discharge a first ingredient 7 to be mixed into the ice cream. The open top of the feeder hopper 6 may be closed off by a removable cover 8. The first ingredient 7 is inserted into the feeder hopper 6 by removing cover 8 and depositing the first ingredient 7 therein. The feeder hopper 6 has a rotating agitator 10 located therein which functions to break apart the first ingredient 7 and keep it fluid. The agitator 10 consists of an elongated shaft 11 with a plurality of stirring paddles 12 extending outwardly therefrom. Stirring paddles 12 are basically elongated thin rods with curved outer ends. One end of shaft 11 is supported by bearing 13 mounted to the front face 14 of the ingredient feeder 2. The other end of shaft 11 is rotated by a power source (not shown) as is known in the art.

Figure 1:
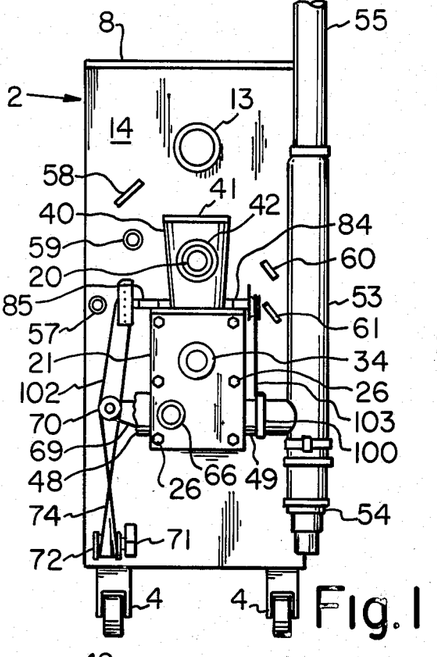
FIG. 1 is a front elevation of an improved ingredient feeder in accordance with the present invention.
Figure 2:
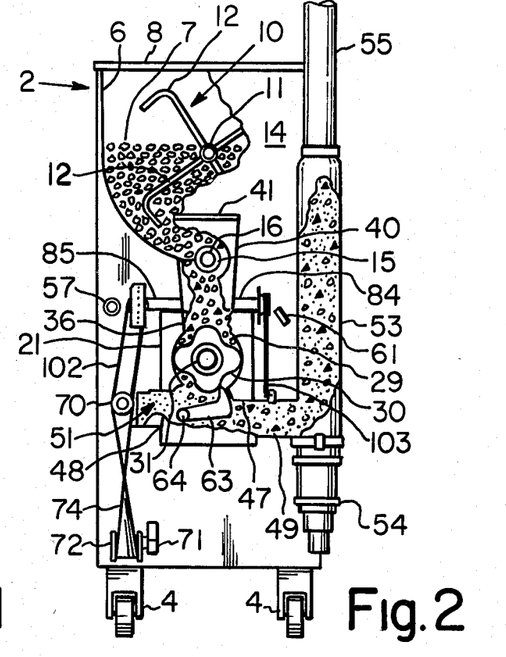
FIG. 2 is a front elevation of FIG. 1, partially broken away and showing the operation of the ingredient feeder.
Figures 3, 5:
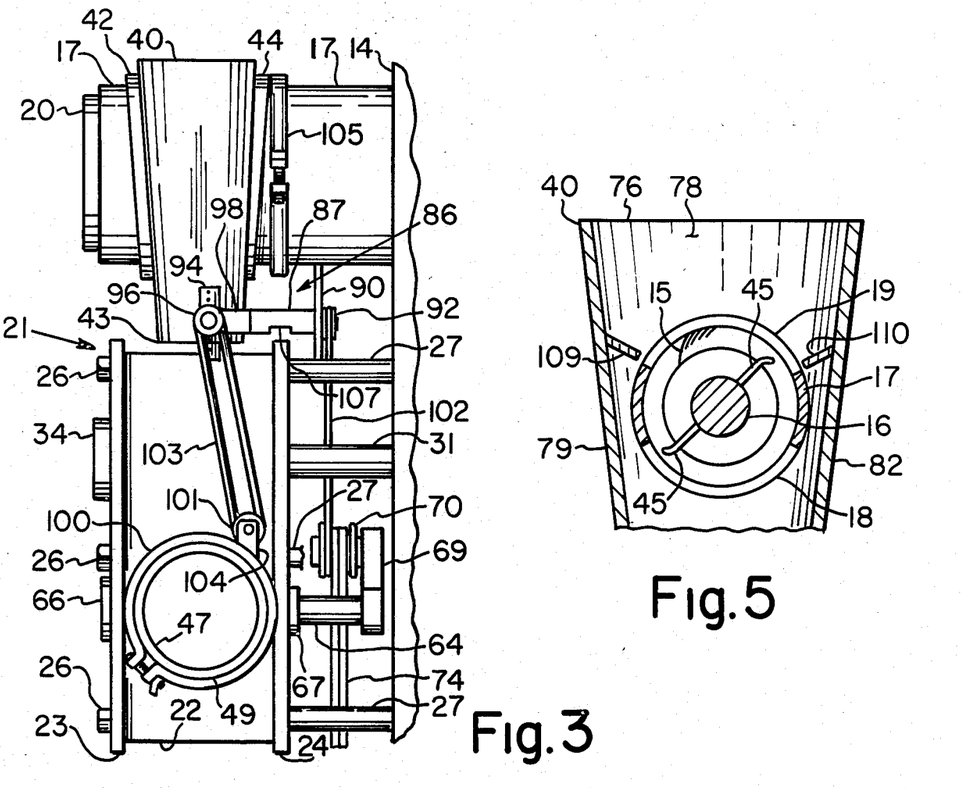
FIG. 3 is a side elevation of a portion of the ingredient feeder shown in FIG. 1 with the chamber funnel cover removed.
FIG. 5 is the top portion of a section taken along lines V—V in FIG. 4.

A rotating auger 15 is located within the feeder hopper 6 at the bottom thereof and is supported by a shaft 16. A portion of the rotating auger 15 extends out of the hopper 6 and through the front face 14 of the ingredient feeder 2. The rotating auger 15 aids both in stirring and breaking apart the first ingredient 7 and in carrying it out of the hopper 6. The portion of the auger 15 located outside of the hopper 6 is substantially surrounded by a cylindrical auger housing 17. The auger housing 17 has a lower discharge opening 18 and an upper inlet opening 19 therethrough. A bearing 20 at the end of auger housing 17 furthest from the face 14 of the ingredient feeder 2 supports one end of auger shaft 16. The other end of the auger shaft 16 is rotated by a power source (not shown) as is known in the art. The rotating auger 15 moves the first ingredient 7 into the auger housing 17 and then out of the auger housing 17 via discharge opening 18. If an additional ingredient is to be introduced simultaneously, it may be inserted via inlet opening 19 in the auger housing 17.

A metering wheel housing 21 is mounted to the front face 14 of the ingredient feeder 2 and is positioned immediately beneath the auger housing 17. The metering wheel housing 21 is formed by a central body 22 sandwiched between a front plate 23 and a rear plate 24. The elements of the metering wheel assembly 21 are held together and are fastened to the front face 14 of the ingredient feeder 2 by a plurality of stud bolts 25 which pass through front plate 23, central body 22 and rear plate 24. Each stud bolt 25 is secured thereto at the front plate 23 by means of a nut 26. The metering wheel housing 21 is spaced away from the ingredient feeder 2 by a plurality of hollow spacers 27, each of which surrounds a stud bolt 25 and extends between and in contact with rear plate 24 and the front face 14 of the ingredient feeder 2.

Figure 6:
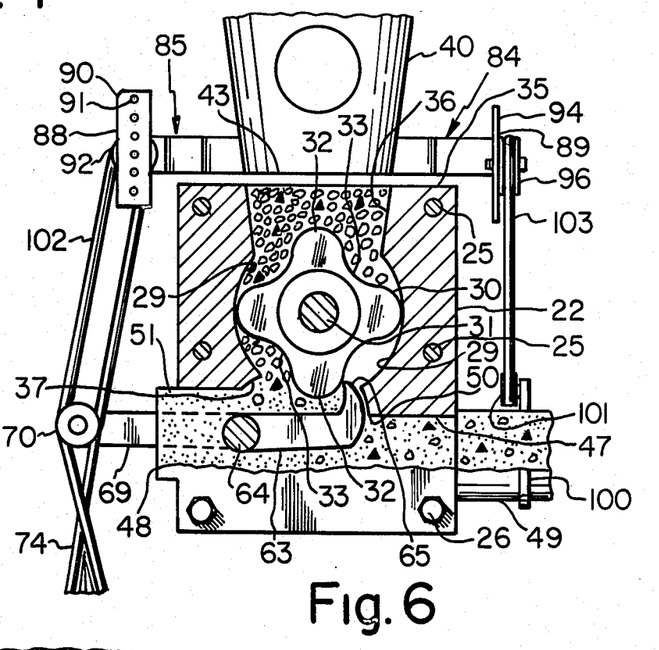
FIG. 6 is a front elevation of the bottom portion of the chamber funnel and of the metering wheel housing, partially broken away, and showing the operation of the present invention.
Figure 7:
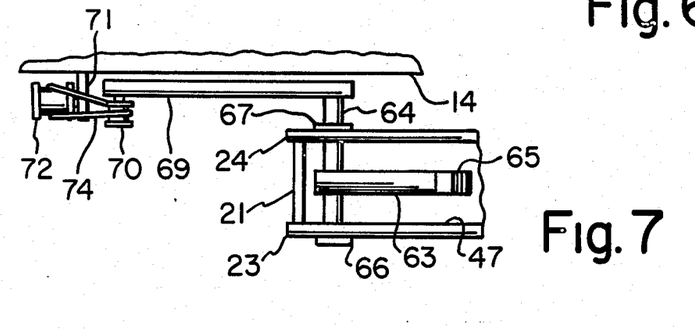
FIG. 7 is a top plan view, partially broken away, of the lower portion of the metering wheel housing.

The central body 22 of the metering wheel housing 21 has located therein an arcuate shaped surface defining an opening 29 which is adapted to accommodate a rotating metering wheel 30 positioned therein. The metering wheel 30 is also known in the art as an enrobing rotor. The metering wheel 30 is secured to shaft 31. The metering wheel 30 is of a known configuration and has a plurality of outwardly oriented teeth or lobes 32 separated by lower valleys 33. The lobes 32 extend outward and contact the surface of arcuate opening 29 when the metering wheel 30 is rotated. Shaft 31 is supported at one end at the front plate 23 by bearing 34. The other end of shaft 31 is located within the ingredient feeder 2 and is rotated by a power source (not shown) as known in the art. The top 35 of the central body 22 has an inlet 36 formed therein and in communication with opening 29 located therebeneath. The central body 22 also has an outlet 37 formed therein and positioned at the bottom of opening 29 and in communication therewith. The top 35 of the central body 22 of the metering wheel housing 21 is positioned beneath the auger housing 17 with the metering wheel housing inlet 36 being aligned with the auger housing discharge opening 18. As is known in the art, the metering wheel 30 functions to portion an ingredient, with the size of the portion defined by the area confined by two adjacent lobes 32 and the surface of opening 29.

A hollow, open-topped and generally cone-shaped chamber funnel 40 is pivotally mounted to the auger housing 17. The top of funnel 40 may be sealed by removable cover 41. The funnel 40 completely surrounds discharge opening 18 and inlet opening 19 in the auger housing 17. Bearings 42 and 44 are provided at opposed sides of the funnel 40 where the funnel 40 is mounted to the auger housing 17. The funnel 40 has a lower end 43 which is spaced above the top 35 of the metering wheel housing 21. The lower end 43 of funnel 40 is positioned immediately above the metering wheel housing inlet 36. In this manner, the first ingredient 7 is directed out of the auger 15, into discharge opening 18, down funnel 40, out of its lower end 43, and into the metering wheel housing inlet 36. If an additional ingredient is to be included, it may be supplied through the top of the funnel 40 after removing the cover 41. This additional ingredient passes into inlet opening 19 in auger housing 17, through auger housing 17, and out of discharge opening 18 to the lower end 43 of funnel 40. For this purpose, and to have a clear-through passage from inlet opening 19 to discharge opening 18, it is preferable that the auger 15 stop short of discharge opening 18 and inlet opening 19. The auger shaft 16 continues through to bearing 34 at the end of the auger housing 17, but the auger shaft 16 alone does not present much of an impediment to the flow of an ingredient therethrough. The end of the auger shaft 16 adjacent discharge opening 18 may include one or more mixing fingers 45 extending outwardly therefrom to aid in ingredient flow.

An elongated, preferably cylindrically shaped passage 47, having inlet pipe 48 and outlet pipe 49, extends transversely beneath the metering wheel 30. Passage 47 has an intermediate opening 50 which is in fluid communication with the metering wheel housing outlet 37. A second ingredient 51, such as a flowing stream of ice cream, can pass from inlet 48 to outlet 49 of passage 47. The first ingredient 7 is discharged from the rotating metering wheel 30 through outlet 37 into intermediate opening 50 in passage 47 and is dispersed directly into the second ingredient 51 flowing through passage 47. While passage 47 is shown in the drawings as being integral with and formed in the central body 22 of the metering wheel housing 21, it is to be understood that the metering wheel housing 21 and passage 47 may be provided as two separate structures joined together at outlet 37 and intermediate opening 50.

The flowing stream of second ingredient 51, with first ingredient 7 deposited therein, passes out of passage 47 throughout outlet pipe 49. At this point the mixture of the two ingredients is generally not uniform. To further mix the ingredients together, and obtain an acceptable product, the ingredients are fed through a blender, such as side-mounted, vertical blender 53 connected directly to outlet pipe 49. Vertical blender 53 is basically an elongated, hollow cylindrical pipe which has a blender mechanism located therein. A drive motor 54 is provided, typically at the bottom of the vertical blender 53, to rotate the blender mechanism. The ingredients flow through the vertical blender 53 where they are thoroughly and completely mixed. This results in an even and homogeneous distribution of the first ingredient 7 throughout the second ingredient 51. The mixture then flows out of the vertical blender 53 and into conduit 55. Conduit 55 takes the mixture to a packaging machine (not shown) where the mixture is placed into containers or the like.

The ingredient feeder 2 shown in the drawings includes, as is typical in the art, a variety of control switches on the front face 14. Shown in FIG. 1 is a metering wheel switch 57, an auger on-off switch 58, an auger speed switch 59, a blender on-off switch 60, and a blender speed switch 61. These switches are used to control the operation and speed of the various rotating elements in the ingredient feeder 2 and are adjusted appropriately in accordance with the nature and characteristics of the first and second ingredients being mixed together.

The ingredient feeder 2 also includes a pivotable wiper arm 63 located entirely within passage 47. Wiper arm 63 is a substantially flat, elongated member with one end rigidly connected to a wiper shaft 64. The other end of wiper arm 63 is formed in an upraised, arcuate shaped portion forming finger 65. Wiper shaft 64 extends through the metering wheel housing 21 and is pivotally mounted thereto by bearing 66 attached to front plate 23 and by bearing 67 attached to rear plate 24. The end of wiper shaft 64 outside of and adjacent rear plate 24 is rigidly connected to one end of an elongated, flat cam bar 69 which extends substantially parallel with passage 47 and the ingredient feeder 2 and is generally spaced a short distance away from the front face 14 thereof. The free end of cam bar 69 has spool 70 mounted thereto on the side of cam bar 69 opposite front face 14 and extending substantially perpendicular thereto. An outwardly extending flat support plate 71 is fastened substantially perpendicular to the front face 14 of the ingredient feeder 2 and is positioned beneath the end of cam bar 69 carrying spool 70. A spool 72 is mounted on one face of support plate 71 and extends, preferably, perpendicular thereto and parallel to the front face 14 of the ingredient feeder 2.

It can be seen that spool 70, cam bar 69 and wiper arm 63 form a unitary structure which is pivotable about wiper shaft 64. Wiper arm 63 is positioned within intermediate opening 50 of passage 47 with finger 65 oriented toward the bottom of the metering wheel 30. One or more elastomeric bands 74, such as a strong rubber band, extend between spool 70 and spool 72. Spool 72, mounted securely to support plate 71, provides a fixed point for the lower end of bands 74. When bands 74 are stretched between spool 70 and spool 72, they will constantly exert a downward force on spool 70. This will cause the cam bar 69 to pivot downwardly about shaft 64 and as a result, cause the wiper arm 63 to pivot upwardly. Wiper arm 63 will pivot upwardly until finger 65 comes into contact with the metering wheel 30. The downwardly directed force from bands 74 causes the wiper arm 63 to be biased upwardly with finger 65 always in contact with the metering wheel 30.

As will be explained hereinafter in more detail, when the metering wheel 30 is rotated, a lobe 32 will come into contact with and push downward on wiper arm 63. Wiper arm 63 will pivot about wiper shaft 64 and cause cam bar 69 to pivot upwardly. This upward movement of cam bar 69 will cause spool 70 to move upwardly and stretch bands 74, placing them under further tension. As a lobe 32 on metering wheel 30 moves beyond wiper arm 63, bands 74 pull spool 70 downwardly until the wiper arm 63 is in contact with a valley 33 on the metering wheel. Then the process is repeated. Spool 70 moves up and down in a vertically reciprocated manner in accordance with the valleys 33 and lobes 32 on the metering wheel 30. As a result of this arrangement, the finger 65 on the wiper arm 63 is always in contact with the metering wheel 30 and functions to wipe away any of said first ingredient 7 which may adhere to the outer surface of the metering wheel 30. The upraised finger 65 on the wiper arm 63 also functions to close off the downstream portion of opening 50 and prevent any of said second ingredient 51 from flowing up into outlet 37 and into the arcuate opening 29 containing the metering wheel 30.

It is preferable that spools 70 and 72 be rotatably mounted to the cam bar 69 and support plate 72, respectively, so that bands 74 are not subjected to abrasive wear as spool 70 moves up and down.

Figure 8:
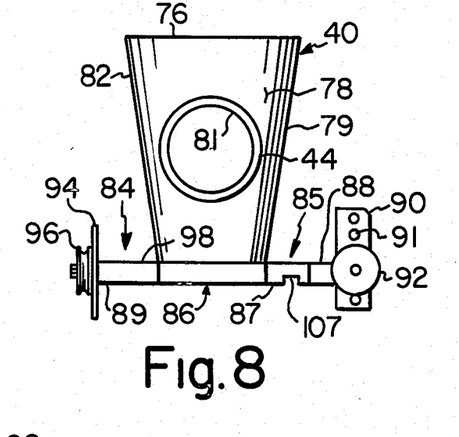
FIG. 8 is a rear elevation of a chamber funnel modified in accordance with the present invention.
Figure 9:
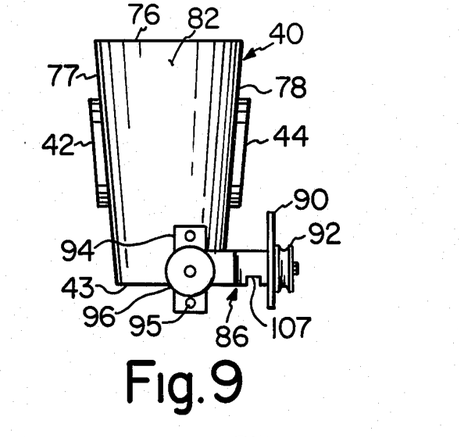
FIG. 9 is a side elevation of the chamber funnel shown in FIG. 8.
Figure 10:
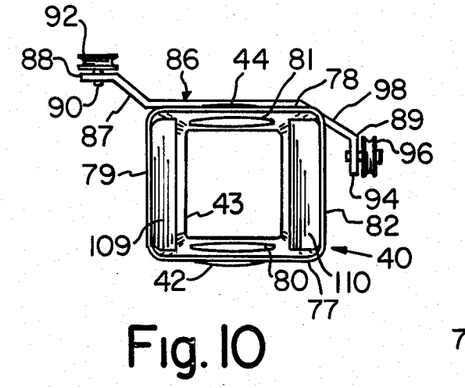
FIG. 10 is a top plan view of the chamber funnel shown in FIG. 8.

The chamber funnel 40 of the present invention is shown in detail and separate and apart from the ingredient feeder 2 in FIGS. 8-10. The funnel 40 is a hollow, inverted frustoconical shaped member having an open top 76, an open lower end 43 and is formed from front panel 77, rear panel 78 and side panels 79 and 82 joined together along adjacent edges. The flat panels 77, 78, 79 and 82 forming funnel 40 have a continuous inward and downward sloping configuration progressing from the wider open top 76 to the more narrow lower end 43. Front panel 77 has an opening 80 therethrough which is axially spaced and opposed from a similar opening 81 through rear panel 78. Openings 80 and 81 have a configuration complementary in shape with and slightly larger than the outer surface of the auger housing 17 and permit the funnel 40 to be mounted about the auger housing 17 by merely sliding the funnel 40 over the free end of the auger housing 17. Since the auger housing 17 shown in the drawings has a circular cross section, likewise, openings 80 and 81 are circular in configuration. Rather than have the front panel 77 and rear panel 78 of funnel 40 directly contact the auger housing 17, it is preferable to provide bearings 42 and 44 mounted securely to the outer surface of the funnel 40 and surrounding opening 80 and opening 81, respectively, in order that the funnel 40 may freely pivot about auger housing 17 without having excess wear of the metal at openings 80, 81 or on auger housing 17.

The funnel 40 also has a first arm 84 connected thereto and extending outwardly beyond one side, as shown, beyond side panel 82. Likewise, funnel 40 has a second arm 85 connected thereto and extending outwardly therefrom in a direction generally opposite that of first arm 84 and extending beyond the other side, as shown, side panel 79. While it is possible to provide first arm 84 and second arm 85 as two separate elements, it is preferable to provide the funnel 40 with a single, elongated rocker bar 86 having portions extending beyond the side panels 82 and 79 of the funnel 40 to form first arm 84 and second arm 85, respectively. As shown in the drawings, the funnel 40 is provided with a rocker bar 86 which is securely fastened to rear panel 78 near the lower end 43 by welding or the like. Rocker bar 86 extends beyond panel 79 and substantially perpendicular thereto for a distance, then extends backward and away from the funnel 40 at about a 45° angle to form angled portion 87 and then terminates in end portion 88 which extends substantially parallel with rear panel 78. Rocker bar 86 also extends frontwardly beyond side panel 82 at about a 45° angle to form angled portion 98 and terminates in end portion 89 which extends substantially parallel with side panel 82. The portion of the rocker bar 86 which extends beyond side panel 82 forms the first arm 84. Similarly, the portion of the rocker bar 86 which extends beyond the side panel 79 forms the second arm 85. Vertical adjuster 90 is provided on end 88 of the second arm 85 and is a rectangular bar which is integral with said rocker bar 86 and has a plurality of vertically spaced holes 91 therethrough. A nylon roller 92 is pivotally mounted to vertical adjuster 90 through one of said holes 91. Similarly, vertical adjuster 94 is provided on end 89 of the first arm 84 and is integral therewith and has a plurality of vertically spaced holes 95 therethrough. Nylon roller 96 is pivotally mounted to vertical adjuster 94 through one of said holes 95. In an alternative embodiment, vertical adjuster 90 and vertical adjuster 94 may have an elongated slot therein, rather than holes 91 and 95, to permit vertical adjustment of nylon rollers 92 and 96, respectively.

Referring once again to FIGS. 1–6, the funnel 40 is shown pivotally mounted to the auger housing 17 of the ingredient feeder 2. Clamp 100 is mounted securely about outlet pipe 49. Nylon roller 101 is pivotally mounted to an upper portion of clamp 100 via plate 104 and functions as a fixed reference point. Nylon roller 92 and spool 70 are physically joined together. Preferably a resilient means, such as elastomeric band 102, extends between nylon roller 92 and spool 70 positioned therebeneath. Although a resilient means is preferred, a non-resilient means, such as a belt, or metal strap, or the like, may join nylon roller 92 and spool 70 together. In addition, a resilient means, such as elastomeric band 103, extends between nylon roller 96 and nylon roller 101 positioned therebeneath. The length of band 102 is such that it is under tension when stretched between nylon roller 92 and spool 70. The tension on band 102 may be adjusted appropriately by moving nylon roller 92 into another of holes 91 in vertical adjuster 90. Similarly, band 103 is under tension when stretched between nylon roller 96 and nylon roller 101 and the tension may be adjusted by moving nylon roller 96 into another of holes 95 in vertical adjuster 94. The tension on band 103 may also be adjusted by rotating clamp 100 about outlet pipe 49 and, thus, changing the position of nylon roller 101.

It is preferable that nylon roller 96 be positioned further away from the front face 14 of the ingredient feeder 2 than nylon roller 101. A rearwardly directed force from tensioned band 103 will be exerted on the funnel 40. A rear stop mechanism on the auger housing 17, such as clamp 105, limits the rearward motion of the funnel 40. In this manner, the funnel 40 is secured to the auger housing 17 without the need for further bolts or the like.

Figure 11:
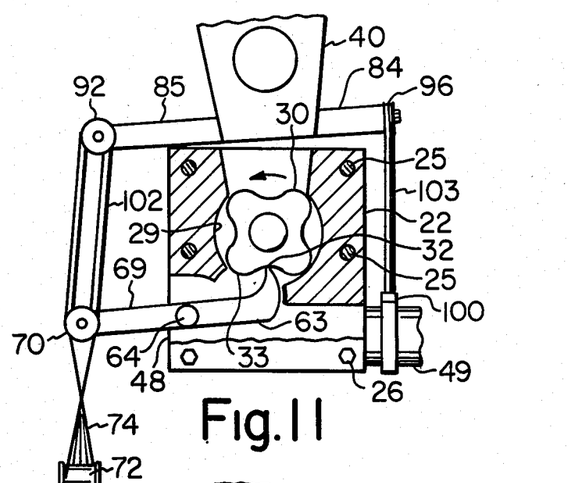
FIG. 11 is a schematic view of the metering wheel housing and chamber funnel showing the metering wheel in a first position.
Figure 12:
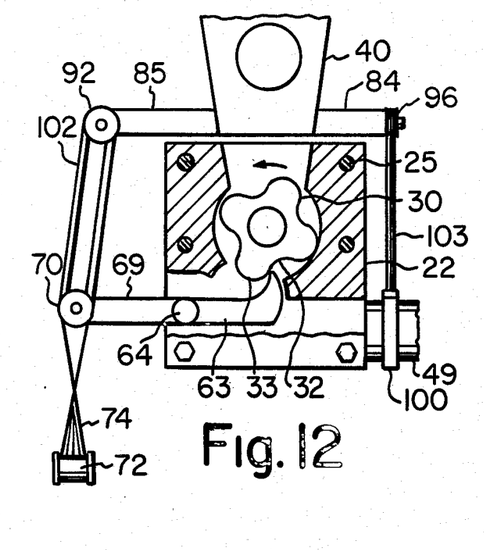
FIG. 12 is the schematic view of FIG. 11 showing the metering wheel in a second position.
Figure 13:
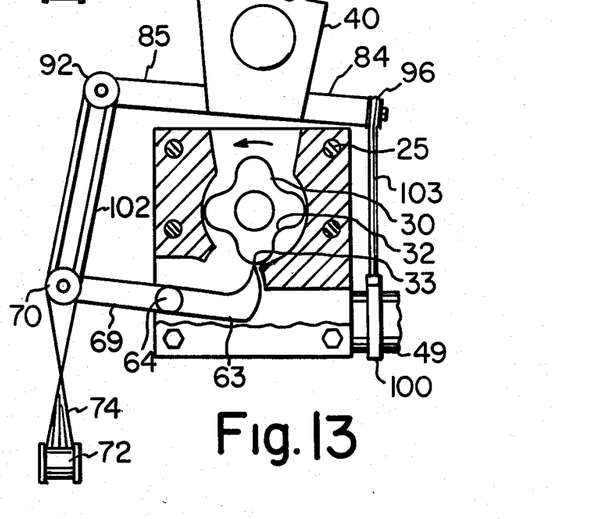
FIG. 13 is the schematic view of FIG. 11 showing the metering wheel in a third position.

The funnel 40 will oscillate relative to the auger housing 17 by means of the vertically reciprocating movement of spool 70 on the end of cam bar 69. As spool 70 moves downward, resulting from the rotation of the metering wheel 30 as described above, band 102 pulls end 88 of second arm 85 downward and causes the funnel 40 to rotate counterclockwise or downward toward the left as viewed in FIG. 6. At the same time, end 89 of first arm 84 will move upward and stretch band 103. Second arm 85 will continue to move downward until it comes into contact with the top 35 of the metering wheel housing 21. Spool 70 moves downward until the finger 65 on the wiper arm 63 is located in a valley 33 of the metering wheel 30. This position is illustrated in FIG. 11. As the metering wheel 30 continues to rotate in a counterclockwise direction, the finger 65 on wiper arm 63 travels along the metering wheel 30 toward the next adjacent lobe 32. As discussed above, the metering wheel 30 pushes down on the wiper arm 63 which results in an upward movement of spool 70 on the cam bar 69. As spool 70 moves upward, the tension on the band 102 is relaxed to an extent and band 103, previously tensioned by the upward movement of the first arm 84 on the funnel 40, pulls back downward on the first arm 84 and the funnel 40 pivots in a clockwise direction. At an intermediate position of the metering wheel 30, the funnel 40 will be oriented with the rocker bar 86 substantially parallel to the top 35 of the metering wheel housing 21 as shown in FIG. 12. As the metering wheel 30 continues to rotate, finger 65 on wiper arm 63 will eventually come into contact with lobe 32. At this point, wiper arm 63 is pivoted downward to its maximum extend and spool 70 is pivoted upward to its maximum extent. While finger 65 is moving toward lobe 32, band 103 continues to pull down on the first arm 84 and rotate the funnel in a clockwise direction. Eventually, the first arm 84 will come into contact with the top 35 of the metering wheel housing 21 as shown in FIG. 13. At this point, band 102 is under its maximum tension. As the metering wheel 30 continues to turn, the wiper arm 63 will pivot upward and the funnel 40 will be rotated counterclockwise about the auger housing 17 due to the downward force exerted on the second arm 85 from spool 70 via band 102. The funnel 40 will pass through the configuration shown in FIG. 12 and eventually reach the configuration shown in FIG. 11 when the second arm 85 comes into contact with the top 35 of the metering wheel housing 21. The above-described cycle is continued repeatedly as the metering wheel 30 rotates. Thus, the funnel 40 will continuously oscillate relative to the auger housing 17 and with a period determined by the speed of rotation of the metering wheel 30, the size of the metering wheel 30 and the number of lobes 32 included thereon.

The oscillation of the funnel 40 will be periodically and abruptly stopped as the lower surface of the arms 84, 85 of the rocker bar 86 contacts the top 35 of the metering wheel housing 21. By using elastomeric bands of sufficient strength and resistance, such as those typically used between spool 70 and spool 72, a large force will be generated whenever the rocker bar 86 contacts the metering wheel housing 21. This force will be sufficient to jar loose any of said first ingredient 7 which becomes lodged in the funnel 40 or in the metering wheel housing inlet 36. The first ingredient 7 is continually vibrated and broken up and is not given a chance to form a restricting mass. Continual flow of the first ingredient 7 through the funnel 40 and metering wheel housing 21 is maintained resulting in improved throughput for the machine and an even and consistent addition of the first ingredient 7 into the second ingredient 51.

The rocker bar 86, shown in the drawings is formed of a particular length and is bent in a particular manner only so that it and the elastomeric bands connected thereto do not interfere with the normal operation of the ingredient feeder 2. The second arm 85 extends backwards at about a 45° angle so that the rocker arm 86 and band 102 does not interfere with or block access to the metering wheel switch 57 or the auger speed switch 59. Nylon roller 92 is oriented with its axis of rotation perpendicular to the front face 14 of the ingredient feeder 2 because spool 70 is also so oriented. In this manner, band 102 is not twisted as it passes between roller 92 and spool 70. Similarly, first arm 84 extends forward at a 45° angle to avoid interference with the blender speed switch 61. Nylon roller 96 has an axis of rotation parallel to the front face 14 of the ingredient feeder 2 because it is convenient to mount roller 101 to clamp 100 therebeneath and orient roller 101 with a similar axis of rotation. The particular arrangement and configuration of the rocker bar 86 will be dictated by the peculiarities and characteristics of the ingredient feeder being modified.

While the first arm 84, the second arm 85 and the clamp 100 are provided with only one nylon roller each, it is possible to provide such a nylon roller on each side of the end of the arms and on each side of plate 104, with a corresponding elastomeric band connected thereto. In this manner, the force exerted on each arm and on the clamp 100 would be balanced.

Figure 4:
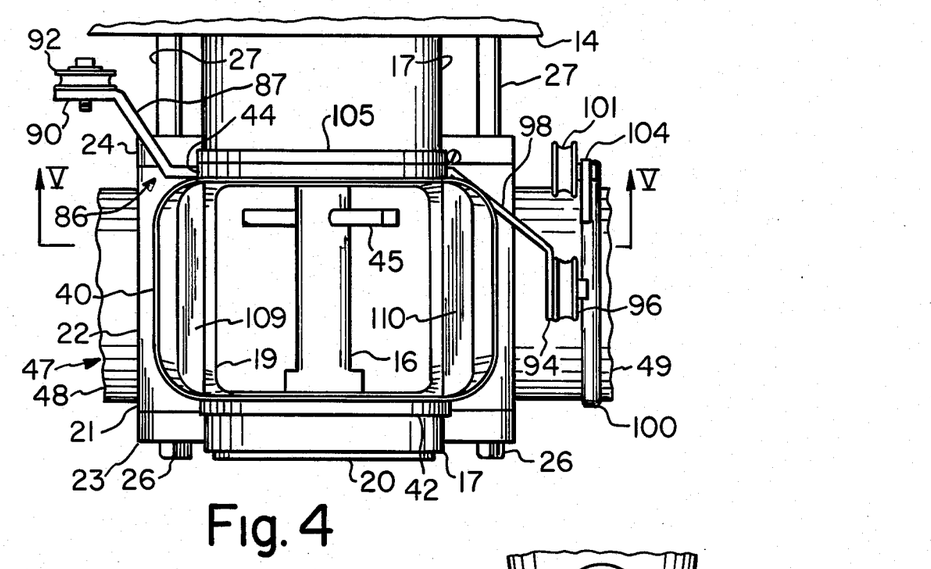
FIG. 4 is a top plan view of the upper portion of the ingredient feeder shown in FIG. 3 with the elastomeric bands removed.

In the arrangement shown in the drawings, especially as seen in FIG. 3, the rocker bar 86 is provided near the lower end of the funnel 40. The rear plate 24 of the metering wheel housing 21 extends upward above the top 35 of central body 22. Rather than move the rocker bar 86 up a corresponding distance, clearance between the rocker bar 86 and the top of the rear plate 24 can be obtained by providing a complimentary notch in the bottom of the rocker bar 86 where it passes over the rear plate 24. As shown in FIGS. 3 and 4, angled portion 87 of the second arm 85 passes over rear plate 24 and notch 107 is provided in the lower surface of angle portion 87. Notch is wide enough to accommodate rear plate 24 and as the funnel 40 oscillates about the auger housing 17 the second arm 85 of rocker bar 86 will impact the metering wheel housing 21 at notch 107. It can be seen that angled portion 98 of the first arm 84 passes over the flat central body 22 of the metering wheel housing 21 and avoids the raised areas of front plate 23 and rear plate 24. Thus no notch is necessary. The lower surface of first arm 84 of rocker bar 86 will impact directly against the top 35 of central body 22 as the funnel 40 oscillates.

As can be seen in FIG. 5, a space is formed between side panels 79 and 80 of the funnel 40 and the outer surface of the auger housing 17. If an additional ingredient is deposited into the top 76 of the funnel 40, some of the ingredient may become wedged between the side panels 79 and 80 and the auger housing 17. To avoid this problem, the interior of the funnel 40 may be provided with a downwardly sloping baffle plate 109 on side panel 79 and a similar baffle plate 110 on side panel 82. Baffles 109 and 110 are positioned to cover up the space between the auger housing 17 and the funnel 40 and to direct all of said additional ingredient directly into inlet opening 19 in the auger housing 17.

Standard and preexisting ingredient feeders can be easily modified to function in accordance with the present invention. In a known prior art ingredient feeder, the lower end of the funnel is positively and securely fastened to the top of the metering wheel housing by a rubber boot which is bolted in place with a plurality of wing nuts. By removing the rubber boot, a short spacing is provided between the lower end of the funnel and the top of the metering wheel housing. In addition, the funnel can freely pivot about the auger housing by removing this rubber boot. Bearings are welded to the preexisting funnel at the circular openings in order to reduce the friction and wear between the funnel and the auger housing. A rocker bar is welded to the lower end of the funnel and has arms extending outward from each side of the funnel. An elastomeric band is provided between one arm and the spool on a preexisting vertically reciprocating cam arm. An elastomeric band is also connected between the other arm and a fixed point. Such a fixed point can be easily provided by mounting a nylon collar on an existing clamp surrounding an outlet pipe feeding into a side blender. The ingredient feeder has now been easily and simply modified in accordance with the present invention. No additional power source is needed to oscillate the funnel since an existing source of motion, the cam bar, is utilized. The modified funnel fits neatly onto the ingredient feeder and remains out of the way of the other operative elements of the ingredient feeder while the funnel oscillates.

The metallic elements in an ingredient feeder, including the chamber funnel, are typically made of stainless steel. It is, therefore, desirable to form the rocker bar 86 and baffles 109, 110 out of stainless steel and weld them directly to the funnel 40. Bands 74 are a standard item on prior ingredient feeders. It is desirable to use elastomeric bands identical to bands 74 for the additional bands 102 and 103. In this way, only one size of elastomeric band is required for the ingredient feeder. Rollers 92, 96 and 101 are preferably a machine grade nylon roller and can be mounted with a stainless steel bolt and stainless steel shoulder bushing. Bearings 42 and 44 are preferably high quality wear bearings and are machined approximately to compensate for the slope of the front panel 77 and rear panel 78 of the funnel 40 relative to the outer surface of the auger housing 17.

Having described the presently preferred embodiment of the invention, it is to be understood that it may be otherwise embodied within the scope of the appended claims.

I claim:

1. An ingredient feeder apparatus for adding a first ingredient to a second ingredient, said apparatus comprising:

(a) a hopper adapted to receive and discharge a first ingredient;

(b) a rotating auger located within said hopper, with a portion of said auger extending out of said hopper;

(c) a cylindrical auger housing surrounding the portion of said auger extending out of said hopper, said auger housing having a discharge opening formed therein;

(d) a metering wheel housing having a top positioned beneath said auger housing, said metering wheel housing having an inlet and an outlet formed therein and a metering wheel located within said metering wheel housing, with said inlet in said metering wheel housing being aligned with said auger housing discharge opening;

(e) a hollow chamber funnel pivotally mounted to said auger housing and surrounding said auger housing discharge opening, said funnel having a lower end spaced above the top of said metering wheel housing and said funnel being positioned to direct a first ingredient passing from said auger housing discharge opening and into said metering wheel housing inlet;

(f) means forming a passage having an inlet end and an outlet end and extending beneath said metering wheel housing outlet, said passage having an intermediate opening in communication with said metering wheel housing outlet, whereby a first ingredient discharged from said metering wheel housing outlet is dispensed into a second ingredient flowing through said passage;

(g) means for oscillating said funnel relative to said auger housing which includes a first arm connected to said funnel and extending outwardly therefrom over the top of said metering wheel housing, a second arm connected to said funnel and extending outwardly therefrom over the top of said metering wheel housing and in a direction generally opposite that of said first arm, resilient means connecting said first arm to a fixed point, and means connecting said second arm to a vertically reciprocating means; and (h) means for periodically and abruptly stopping the oscillation of said funnel, said means generating a force on said funnel sufficient to jar loose any first ingredient which becomes lodged in said funnel or in said metering wheel housing inlet, whereby said oscillation of said funnel results from both the force exerted on said second arm from said reciprocating means and from the force exerted on the first arm when the resilient means is tensioned during the motion of said funnel about said auger housing from said reciprocating means and the oscillation of said funnel being periodically and abruptly stopped when said first arm and said second arm strike the top of said metering wheel housing.

2. The ingredient feeder of claim 1 wherein said fixed point is disposed beneath said first arm and said vertically reciprocating means is disposed beneath said second arm.

3. The ingredient feeder of claim 2 wherein said resilient means is a first elastomeric band.

4. The ingredient feeder of claim 3 wherein said second arm is connected to said vertically reciprocating means by a second elastomeric band.

5. The ingredient feeder of claim 4 wherein an outer end of said first arm has a first roller pivotally mounted thereto and wherein an outer end of said second arm has a second roller pivotally mounted thereto, with said first elastomeric band connected to said first roller and with said second elastomeric band connected to said second roller.

6. The ingredient feeder of claim 5 wherein the outer end of said first arm has means for vertically adjusting the position of said first roller and the outer end of said second arm has means for vertically adjusting the position of said second roller whereby the tension on said first elastomeric band and said second elastomeric band may be adjusted.

7. The ingredient feeder of claim 6 wherein the means for vertically adjusting the position of said first roller is a plurality of spaced holes in said first arm and the means for vertically adjusting the position of said second roller is a plurality of spaced holes in said second arm.

8. The ingredient feeder of claim 1 wherein said fixed point includes a third roller pivotally mounted to a clamp which is mounted around the inlet end of said passage extending beneath said metering wheel housing outlet.

9. The ingredient feeder of claim 1 wherein said vertically reciprocating means includes a shaft pivotally mounted within said passage and having a portion extending out of said passage, a cam bar having a free end and having another end mounted to the portion of said shaft outside of said passage and extending outward therefrom, a wiper arm disposed within said passage beneath said metering wheel and mounted at one end to said shaft and extending outward therefrom in a direction generally opposite that of said cam bar, means biasing the free end of said cam bar in a downward direction and, thereby, biasing the other end of said wiper arm in an upward direction, with said wiper maintained in contact with the metering wheel, whereby the wiper arm moves as it follows the surface of said metering wheel and causes said cam bar to oscillate about said shaft, with the free end of said cam bar vertically reciprocating as the metering wheel rotates, and with said second elastomeric band connected to the free end of said cam bar.

10. The ingredient feeder of claim 1 wherein said auger housing has an inlet opening above said discharge opening and said funnel has mounted therein one or more baffles adapted to direct a further ingredient into said inlet opening.

11. The ingredient feeder of claim 1 wherein said funnel has an elongated rocker bar mounted thereto and having one end extending outwardly beyond said funnel and forming said first arm and having another end extending outwardly beyond said funnel and forming said second arm.

12. The ingredient feeder of claim 11 wherein said rocker bar is mounted near said lower end of said funnel.

13. A chamber funnel for use in directing ingredients in an ingredient feeder apparatus, said funnel comprising:

(a) a hollow funnel having an open top and an open lower end and having a downwardly sloping interior surface.

(b) a pair of opposed aligned openings axially spaced apart and extending through said hollow funnel, said openings having a configuration whereby said funnel can be pivotally mounted about an auger housing on an ingredient feeder;

(c) a first arm connected to said funnel and extending outwardly therefrom, said first arm adapted to be connected by a resilient means to a fixed point on a first ingredient feeder; and (d) a second arm connected to said funnel and extending outwardly therefrom in a direction generally opposite that of said first arm, said second arm adapted to be connected to a means for vertical reciprocation on an ingredient feeder, wherein an outer end of first arm has a first roller pivotally mounted thereto and wherein an outer end of said second arm has a second roller pivotally mounted thereto, with said first roller adapted to connect said first arm to said fixed point and said second roller adapted to connect said second arm to said means for vertical reciprocation.

14. The chamber funnel of claim 13 wherein the outer end of said first arm has means for vertically adjusting the position of said first roller and the outer end of said second arm has means for vertically adjusting the position of said second roller.

15. The chamber funnel of claim 14 wherein the means for vertically adjusting the position of said first roller is a plurality of spaced holes in said first arm and the means for vertically adjusting the position of said second roller is a plurality of spaced holes in said second arm.

16. The chamber funnel of claim 13 wherein said funnel has an elongated rocker bar mounted thereto and having one end extending outwardly beyond said funnel and forming said first arm and having another end extending outwardly beyond said funnel and forming said second arm.

17. The chamber funnel of claim 16 wherein said rocker bar is mounted near said lower end of said funnel.

18. The chamber funnel of claim 13 including one or more angled baffles mounted to the interior surface of said funnel, said baffles adapted to direct an ingredient into an inlet opening of an auger housing.

19. The chamber funnel of claim 13 further including a wear bearing surrounding each opening and mounted to said funnel.

* * * * *